July 24, 1962 I. W. SANDBERG 3,046,504

ACTIVE MULTIPORT NETWORKS

Filed March 3, 1961

INVENTOR
I. W. SANDBERG
BY R. O. Nimz
ATTORNEY

United States Patent Office 3,046,504
Patented July 24, 1962

3,046,504

ACTIVE MULTIPORT NETWORKS

Irwin W. Sandberg, Springfield, N.J., assignor to Bell Telephone Laboratories, Incorporated, New York, N.Y., a corporation of New York Filed Mar. 3, 1961, Ser. No. 93,064
11 Claims. (Cl. 333—80)

This invention relates to signal transmission networks and, more particularly, to reciprocal active $n$-port networks without inductors in which all of the driving-point and transfer parameters may be preselected without restriction.

In many signal transmission networks, it is often desirable to realize certain driving-point and transmission functions without the use of inductors, particularly at low frequencies. This arises from the fact that inductors used at these frequencies are generally large, cumbersome, expensive, and are usually far from ideal components. A large amount of work has therefore been done in synthesizing networks having desired properties but having no inductors. In the copending application of the present applicant, Serial No. 66,755, filed November 2, 1960, for example, there is disclosed a structure for realizing all of the driving-point and transfer parameters of an $n$-port network without the use of inductors. This structure, however, requires the use of a large number of resistive and capacitive networks and the use of amplifiers having nearly ideal input and output impedances.

It is an object of the present invention to synthesize reciprocal $n$-port transmission networks employing two-terminal negative impedances and no inductors in which all of the transfer and driving-point functions may be arbitrarily chosen.

In accordance with the present invention, a generalized multi-port transmission network is obtained including only resistors, capacitors and negative impedances in which all of the parameters may be preselected without restriction except that transmissions between pairs of ports must be reciprocal. The network comprises at least $n$ negative impedances and a $2n$-port subnetwork including only resistors and capacitors interconnecting the $n$ external ports with the $n$ negative impedances.

In the most general case the $2n$-port subnetwork includes only two-port networks each including only resistors and capacitors by means of which each of the $n$ external ports is connected to each negative impedance. Similar two-port networks connect each of the $n$ external ports to the remaining external ports and similar two-port networks connect each negative impedance to the remaining negative impedances. The parameters of the individual resistance-capacitance networks are chosen according to the method to be described below to realize any arbitrarily chosen set of symmetric over-all network parameters.

These and other objects and features, the nature of the present invention and its various advantages, will be more readily understood upon consideration of the attached drawings and the following detailed description of the drawings.

Figure 1:
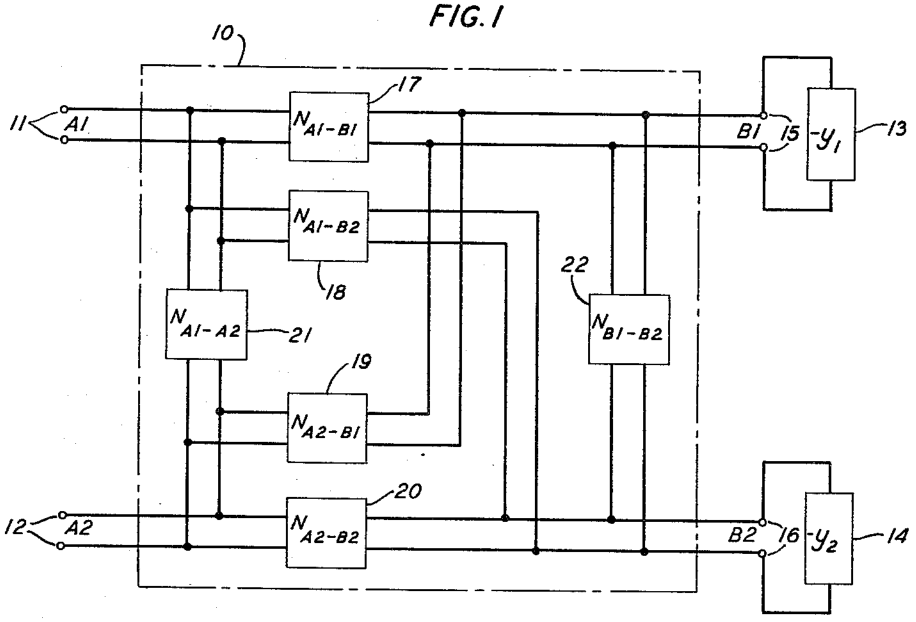
FIG. 1 is a schematic block diagram of a two-port network in accordance with the present invention including only resistors, capacitors and negative impedances.

Referring more particularly to FIG. 1, there is shown a schematic block diagram of a generic two-port network in accordance with the present invention in which the parameters as seen from each of the two ports may be chosen arbitrarily. A two-port network is illustrated in FIG. 1 only for purposes of simplicity and it is to be understood that the invention is not so limited but is, in fact, applicable to any $n$-port network.

The network of FIG. 1 comprises a subnetwork 10 within the dashed rectangle which includes only resistive and capacitive elements. Subnetwork 10 has, in general, $2n$-ports $n$ of which comprise the individual external ports of the over-all network. Thus terminals 11 and 12 provide access to ports A1 and A2 respectively of said network 10. The remaining $n$ of the $2n$-ports of a generalized subnetwork 10 provide access to $n$ two-terminal negative impedances such as negative impedances 13 and 14 in FIG. 1. Thus terminals 15 and 16 provide access to ports B1 and B2 respectively of subnetwork 10.

It can be seen that, in accordance with the present invention, an $n$-port network may be synthesized with arbitrarily chosen symmetric parameters and including no inductors by interconnecting no more than $n$ negative impedances and the $n$ external ports with a subnetwork such as subnetwork 10 including only resistors and capacitors. In the general case subnetwork 10 includes $(2n^2-n)$ two-port networks each of which includes only resistors and capacitors. A two-port network is connected between each of input terminals 11 and 12 and each of negative impedances 13 and 14. Thus networks 17 and 18 connect terminals 11 (A1) to negative impedances 13 and 14, respectively, and networks 19 and 20 connect terminals 12 (A2) to the same respective negative impedances.

In addition, another $$\frac{n^2-n}{2}$$

two-port networks connect each of the external ports (11 and 12) to each other of the external ports (network 21 connects terminals 11 to terminals 12). Similarly, another $$\frac{n^2-n}{2}$$

two-port networks connect each of the $n$ negative impedances (13 and 14) to each other of the $n$ negative impedances (network 22 connects negative impedance 13 to negative impedance 14).

In accordance with the present invention, a network of the form shown in FIG. 1 can be realized for synthesizing any possible combination of symmetric parameters at the $n$ external ports. Networks having any possible number of ports and, hence, any possible number of prescribed parameters, may be constructed in accordance with the present invention, using the same general form as employed in FIG. 1. In the most general case, a two-port network without inductors is connected between all possible pairs of ports of the subnetwork.

Figure 2A:
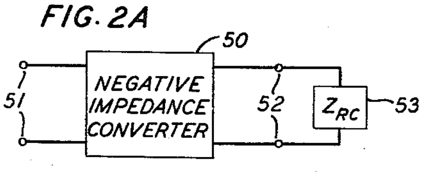
FIGS. 2A and 2B are diagrams of two circuits for realizing two-terminal negative impedances.
Figure 2B:
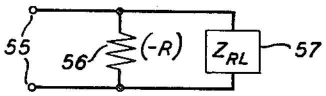

Referring then to FIGS. 2A and 2B, there are shown two examples of circuits for obtaining two-terminal negative impedances suitable for use in the network of FIG. 1. Numerous other arrangements are known in the art and any one of them would be equally suitable. FIG. 2A shows a negative impedance converter 50 having input terminals 51 and output terminals 52. Across the output terminals 52 there is connected a two-terminal positive impedance 53 including only resistors and capacitors. As is well known, the negative impedance converter is a circuit which presents an impedance to one pair of terminals which is the negative of the impedance connected across the other pair of terminals. Hence a negative resistive-capacitive impedance appears across terminals 51 and these terminals may therefore be connected across terminals 15 or 16 in FIG. 1. Various forms of negative-impedance converters are discussed and analyzed in an article by A. I. Larkey, entitled "Negative-Impedance Converters," and appearing at pages 124 through 131 of the I.R.E. Transactions on Circuit Theory, volume CT–4, Number 3, September 1957.

Referring to FIG. 2B, there is shown another circuit for realizing negative resistive-capacitive impedances comprising a pair of terminals 55 across which there are connected a negative resistance 56 in parallel with a positive resistive-inductive empedance 57. Negative resistance 56 may take any one of the many known forms including such devices as the so-called "tunnel" or "Esaki" semiconductor diode, the dynatron, gas tube devices, and other semi-conductor and vacuum tube circuits exhibiting this property across selected terminals. The positive resistive-inductive impedance 57 need not include expensive high Q inductors since losses in the inductors can be compensated for by the negative resistance 56. A method for translating circuits of the form of FIG. 2A into equivalent circuits of the form of FIG. 2B is disclosed in an article by F. T. Boesch and M. R. Wohlers, entitled "On Network Synthesis With Negative Resistance," appearing at pages 1656 through 1657 of the Proceedings of the I.R.E., September 1960.

Figure 3:
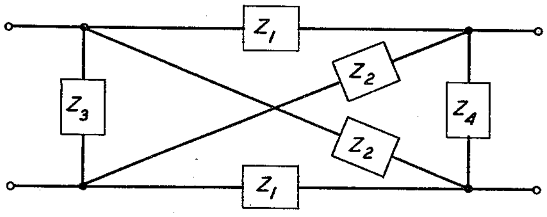
FIG. 3 is a generalized block diagram of a two-port lattice type network suitable for all the two-port networks of FIG. 1.

FIG. 3 is a generalized block diagram of a two-port (four-terminal) network of the lattice type, which is one form that is suitable for all of the two-port networks in subnetwork 10 of FIG. 1. Proper choice of the individual impedances $Z_1$, $Z_2$, $Z_3$ and $Z_4$ provide an over-all two-port network with all of the required properties. More specifically, each of the two terminal networks $Z_1$, $Z_2$, $Z_3$ and $Z_4$ may have the form shown in FIG. 4A or 4B.

Figure 4B:
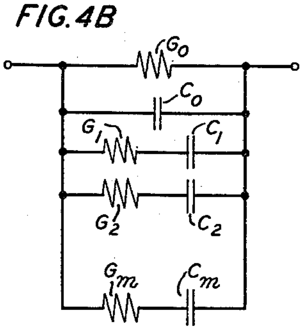
FIGS. 4A and 4B are circuit diagrams of two forms of generalized two-terminal resistive-capacitive networks for realizing each of the impedances in FIGS. 2A and 3.
Figure 4A:
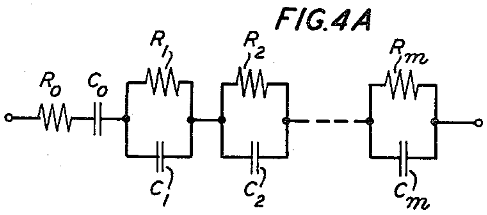

In FIG. 4A there is shown a two-terminal resistive-capacitive (RC) network which, with proper choices of resistances and capacitances, will generate any impedance possible with only resistors and capacitors. The network of FIG. 4A is the so-called "First Foster Form" and comprises a series resistance, a series capacitance and $m$ parallel resistance-capacitance sections connected in series.

FIG. 4B illustrates another two-terminal resistance-capacitance network which will generate any possible RC impedance. This network is the so-called "Second Foster Form" and comprises a resistor and a capacitor in parallel with $m$ series resistive-capacitive sections. The networks of FIGS. 4A and 4B are more fully discussed and analyzed in the text "Synthesis of Passive Networks," by E. A. Guillemin, Wiley and Sons, 1957, and will not be discussed further here except to note that many other network forms could also be used for this purpose. Networks of the form shown in FIGS. 4A and 4B could be used for the impedances of FIG. 3 as well as the impedances of FIGS. 2A and 2B. In the latter case, of course, inductors would be substituted for the capacitors shown.

Returning to FIG. 1, it is possible to analyze this network mathematically most conveniently by means of matrix techniques. The generalized $2n$-port subnetwork 10 can be characterized in terms of its external behavior at the $2n$-ports, that is, in terms of the relationships of the $2n$ voltages and $2n$ currents appearing at these ports. For this purpose, it is convenient to define an admittance matrix $\hat{Y}$ such that $$I=\hat{Y}E \qquad (1)$$

where I and E are the column vectors of currents and voltages, respectively at the $2n$ ports of subnetwork 10. The matrix $\hat{Y}$ is a $2n$ by $2n$ short-circuit admittance matrix relating I and E and having a total of $4n^2$ terms. Each of these terms may be written as a rational function of $s$ where $s$ is the complex frequency variable ($s=j\omega$ where $\omega$ is the radian frequency variable).

Each diagonal term in the $2n$ by $2n$ admittance matrix $\hat{Y}$ is the short-circuit driving point admittance at one of the $2n$ ports. Similarly, each off-diagonal term in the matrix $\hat{Y}$ is the short-circuit transfer admittance between two of the $2n$ ports. More specifically, the term in the $i$th row and $j$th column of the matrix $\hat{Y}$ is the short-circuit transfer admittance between ports $i$ and $j$. Hence, the admittance matrix $\hat{Y}$ completely specifies subnetwork 10 and can be directly related to the individual two-port networks within subnetwork 10.

Thus, in a generalized structure similar to FIG. 1, the first $n$ of the $2n$ ports would be labeled A1, A2, . . . AN and would comprise the external ports while the remaining $n$ of the $2n$ ports would be labeled B1, B2, . . . BN and would comprise the terminals of the $n$ negative impedances. Each of the two-port networks within subnetwork 10 is identified with two subscripts identifying the particular pair of the $2n$ ports between which it is connected. These two-port networks can, therefore, be directly identified with corresponding terms in the matrix $\hat{Y}$ and, indeed, can be designed to provide the short-circuit transfer admittance expressed in the off-diagonal terms of $\hat{Y}$. The short-circuit driving-point admittances expressed in the diagonal terms of $\hat{Y}$ can be identified with the admittances connected to the ports. These terms can be taken care of in the network of FIG. 1 by appropriately modifying the shunt elements in the two-port networks connected to each port.

It is convenient to partition the $4n^2$ terms of the matrix $\hat{Y}$ into four $n$ by $n$ submatrices as follows:

$$\hat{Y}=\left[\begin{array}{c|c} Y_{AA} & Y_{AB} \\ \hline Y_{BA} & Y_{BB} \end{array}\right] \qquad (2)$$

where each of the terms in the matrix is itself a matrix having $n^2$ terms. $Y_{AA}$, for example, contains the $n^2$ elements appearing in the first $n$ columns and first $n$ rows of $\hat{Y}$ and hence expresses all of the relations between the currents and the voltages at ports A1, A2, . . . AN when all other ports are short circuited. Similarly, $Y_{AB}$ also has $n^2$ terminals and expresses all of the transfer relations between the currents and voltages at ports A1, A2, . . . AN and B1, B2, . . . BN when all other ports are short circuited.

Returning to the over-all network of FIG. 1, an admittance matrix Y, representing the relationships of the current and voltages at the $n$ external ports A1, A2, . . . AN and hence the desired over-all properties of the network of FIG. 1, may be expressed as follows:

$$Y=Y_{AA}-Y_{AB}[Y_{BB}-\text{diag.}\ (y_1, y_2, \ldots y_n)]^{-1}Y_{AB}^t \qquad (3)$$

where $Y_{AA}$, $Y_{AB}$ and $Y_{BB}$ are defined in Equation 2, the superscript $t$ indicates matrix transposition, and $$-\text{diag.}\ (y_1, y_2, \ldots y_n)$$

is the diagonal matrix of the negative admittances exhibited by the negative impedances 13 and 14.

It will be noted that the matrix $\hat{Y}$ is symmetrical and, hence, the submatrix $Y_{BA}$ is uniquely related to $Y_{AB}$ appearing in Equation 3. That is, once $Y_{AB}$ is determined, $Y_{BA}$ may be obtained merely by interchanging respective rows and columns. In accordance with the present invention, each of these submatrices will be chosen (1) to realize any desired symmetrical Y, and (2) to render $\hat{Y}$ realizable with only resistors and capacitors.

An admittance matrix of the form of $\hat{Y}$ may be expressed in the following partial fraction form:

$$Y = sK_\infty + \sum_{m=0}^{M} K_m \frac{s}{s+\gamma_m} \quad (4)$$

where $s$ is the complex frequency variable, $\gamma_m$ in every term is a non-negative real number, where $0=\gamma_1<\gamma_2, \ldots <\gamma_M$, and $K_\infty$ and $K_m$ represent $2n$ by $2n$ coefficient matrices of real constants. For simplicity, it is assumed that $\hat{Y}$ does not have a pole at infinity ($K_\infty=0$).

A sufficient condition for the realizability of the $2n$-port subnetwork 10 characterized by $\hat{Y}$ with only resistors and capacitors is that each of the matrices $K_m$ satisfy the so-called "dominant-diagonal condition." That is, each diagonal term in each of these matrices must be no less than the sum of the magnitudes of all of the off-diagonal terms in the row in which the diagonal term appears, that is, $$m_{jj} \geq \sum_{k \neq j} |m_{jk}| \quad (5)$$

A general method for synthesizing resistive-capacitive networks whose admittance matrices satisfy the dominant-diagonal condition is shown in a paper by P. Slepian and L. Weinberg, entitled "Synthesis Applications of Paramount and Dominant Matrices," appearing at pages 611 through 630 in the "Proceedings of the National Electronics Conference," October 1958, and hence will not be discussed in detail here.

In order to synthesize $\hat{Y}$ with a network including only resistors and capacitors it is therefore sufficient to satisfy Equation 3 with submatrices $Y_{AA}$, $Y_{AB}$ and $Y_{BB}$ such that $\hat{Y}$, when expressed in the form of Equation 4, satisfies Equation 5.

It is assumed, of course, that Y, the desired and arbitrarily chosen symmetrical admittance matrix for the over-all network of FIG. 1, is expressed as a matrix of $n^2$ real rational functions in $s$. This involves no loss of generality since, as is well known, the desired parameters can be expressd to as close approximation as desired merely by increasing the degree of these polynomials.

It is then necessary to factor Y so as to obtain a common denominator D which is also a polynomial in $s$ such that $$Y = \frac{1}{D}[m_{ij}] = \frac{1}{D} N_{ij} \quad (6)$$

where $N_{ij}$ is an $n$ by $n$ matrix of polynomials in $s$. The submatrix $Y_{AA}$ can also be expressed as an $n$ by $n$ matrix in ratios of polynomials in $s$ such that $$Y_{AA} = \frac{1}{q}[x_{ij}] = \frac{1}{q} X_{AA} \quad (7)$$

where $q$ is another common denominator polynomial in $s$ having only distinct negative-real zeros and $X_{AA}$ is also an $n$ by $n$ matrix of polynomials in $s$. The submatrix $Y_{AB}$ can be expressed in the form $$Y_{AB} = \frac{1}{q} X_{AB} \quad (8)$$

where $q$ is as defined above and $X_{AB}$ is another $n$ by $n$ matrix of polynomials in $s$. With this nomenclature, Equation 3 may be rewritten $$-\frac{D}{q} X_{AB}^t [qN_{ij} - DX_{AA}]^{-1} X_{AB} = Y_{BB} - \text{diag.}\ (y_1, y_2, \ldots y_n) \quad (9)$$

It is convenient to define two $n$ by $n$ matrices of polynomials $P_1$ and $P_2$ such that $$P = P_1 P_2 = [qN_{ij} - DX_{AA}] \quad (10)$$

Substituting Equation 10 in Equation 9 there is obtained $$-\frac{D}{q} X_{AB}^t P^{-1} X_{AB} = Y_{BB} - \text{diag.}\ (y_1, y_2, \ldots y_n) \quad (11)$$

The left-hand side of Equation 11 can be written before cancellation of common factors as a matrix of real rational functions with a common denominator polynomial equal to $q$ times the determinant of P. Since the poles of the right-hand side of Equation 11 are required to be distinct and on the negative-real axis, $X_{AB}$ must be chosen so that the least common denominator polynomial of the matrix of rational functions has only zeros that are also distinct and on the negative-real axis.

It is necessary to choose $Y_{AA}$ such that (1) Its coefficient matrices as defined by Equation 4 satisfy the dominant-diagonal condition with inequality, that is, the diagonal elements are greater than the sums of the off-diagonal terms in the corresponding rows. One simple way of assuring this result is to choose $Y_{AA}$ such that all of the diagonal terms are multiplied by an arbitrary large constant.

(2) The term $[qN_{ij} - DX_{AA}]$ can be written as the product $P_1P_2$ such that the remaining submatrices are realizable.

It will be noted that the necessary factors $P_1$ and $P_2$ can always be obtained if (1) the degree of each diagonal polynomial element in $X_{AA}$ is equal to the degree of $q$, and (2) the degree of $q$ is equal to $n$ times the greater of ($a$) the highest degree in the polynomials of $N_{ij}$, or ($b$) the degree of D, that is, $$\text{Deg. } q = n \text{ Max. [Max. Deg. } N_{ij}\text{; Deg. } D]$$

The further condition must also be made that the determinant of $P_2$ has only distinct negative-real zeros that are different from the zeros of $q$ and that $P_1$ be of the same degree as $q$. A method for determining the factors $P_1$ and $P_2$ of P satisfying these requirements is shown in an article by the present applicant, entitled "Synthesis of N-Port Active RC Networks," appearing at pages 329 through 347 of The Bell System Technical Journal, volume 40, Number 1, January 1961.

The left-hand side of Equation 11 will have only distinct negative-real poles if $X_{AB}$ is chosen to be equal to $$\frac{1}{\alpha} P_1$$

where $\alpha$ is any non-zero real constant. It will be noted that the magnitude of $\alpha$ can be chosen to be sufficiently large to insure the satisfaction of the dominant-diagonal condition for the first $n$ rows of $\hat{Y}$. Hence from Equation 8

$$Y_{AB} = \frac{1}{\alpha q} P_1 \quad (12)$$

Having obtained this value for $Y_{AB}$, it remains only to identify $Y_{BB}$ and the $y_i$ of diag. $(y_1, y_2, \ldots y_n)$ such that the dominant-diagonal condition can be satisfied in the last $n$ rows of $\hat{Y}$.

Since the left-hand side of Equation 11 is regular at infinity, Equation 11 can be written $$Y_{BB} - \text{diag.}\ (y_1, y_2, \ldots y_n) = \sum_{m=0}^{M} A_m \frac{s}{s+\gamma_m} \quad (13)$$

where the $A_m$ are real symmetric coefficient matrices and $0=\gamma_0<\gamma_1<\gamma_2< \ldots <\gamma_M$.

It can be seen from Equation 13 that each off-diagonal term in $Y_{BB}$ is equal to the corresponding sum of off-diagonal terms on the right-hand side of Equation 13, i.e.

$$Y_{BB} \overset{OD}{=} \sum_{m=0}^{M} A_m \frac{s}{s+\gamma_m} \quad (14)$$

where the "OD" over the equal sign indicates that the equality holds true only for the off-diagonal terms. Similarly, the diagonal terms on either side of Equation 13 may be equated to obtain $$\text{diag.}\ (y_{n+1,n+1}, y_{n+2,n+2}, \ldots y_{2n,2n}) - \text{diag.}\ (y_1, y_2, \ldots y_n) = \sum_{m=0}^{M} \frac{s}{s+\gamma_m}\ \text{diag.}\ (a_{11_m}, a_{22_m}, \ldots a_{nn_m}) \quad (15)$$

In order to separately identify the elements on the left-hand side of Equation 14, we may let $$\text{diag.}\ (a_{11_m}, a_{22_m}, \ldots a_{nn_m}) = \text{diag.}\ (b_{11_m}, b_{22_m}, \ldots b_{nn_m}) - \text{diag.}\ (c_{11_m}, c_{22_m}, \ldots c_{nn_m}) \quad (16)$$

where each of the $b_{11_m}$ and $c_{11_m}$ are non-negative. The diagonal terms in $Y_{BB}$ can now be identified as follows:

$$Y_{BB} \overset{D}{=} \sum_{m=0}^{M} \frac{s}{s+\gamma_m}\ \text{diag.}\ (b_{11_m}+d_{11_m}), (b_{22_m}+d_{22_m}), \ldots (b_{nn_m}+d_{nn_m})] \quad (17)$$

and the diagonal matrix of negative impedances is given by $$\text{diag.}\ (y_1, y_2, \ldots y_n) = \sum \frac{s}{s+\gamma_m}\ \text{diag.}\ (c_{11_m}+d_{11_m}), (c_{22_m}+d_{22_m}), \ldots (c_{nn_m}+d_{nn_m}) \quad (18)$$

In each case the matrices diag. $(d_{11_m}, d_{22_m} \ldots d_{nn_m})$ are chosen to satisfy the dominant-diagonal condition in the last $n$ rows of $\hat{Y}$.

The construction of the complete coefficient matrices for $\hat{Y}$ from Equations 12, 14, 17 and 18 and the realization of the network from these coefficient matrices are straightforward and will not be given here. Examples of this technique are outlined in the aforementioned copending application by the present applicant, Serial Number 66,755, filed November 2, 1960, and in the copending application of the present applicant filed of even date herewith, Serial Number 93,063, filed March 3, 1961.

It will be noted that the matrix Y, representing the over-all network parameters for the network of FIG. 1, may be arbitrarily prescribed in all its elements subject only to the condition that the matrix must be symmetrical. Thus, in accordance with the present invention, it is possible to synthesize many desirable network parameters by means of a $2n$-port subnetwork including only resistors and capacitors and $n$ negative resistive-capacitive impedances.

It will be apparent that there are many degrees of freedom in choosing the elements of $\hat{Y}$ over and above the requirements of Equations 7, 8, 12, 16 and 17. This freedom may be utilized for other desirable purposes such as reducing the sensitivity of the over-all parameters to changes, for example, in the conversion factors of the negative-impedance converters.

In the event that the desired parameters are expressed as a symmetric open-circuit impedance matrix Z for which the inverse short circuit admittance matrix Y cannot be found, the synthesis technique can be carried out by assuming a negative resistance is connected in series with each of the $2n$ ports. The numerical value of these negative resistances can be expressed as a diagonal matrix $$R = \text{diag.}\ (r_1, r_2, \ldots r_n) \quad (19$$

It will be noted that an admittance matrix $Y'$ can always be found in which $$Y' = [Z - R]^{-1} \quad (20)$$

merely by choosing R sufficiently large. The synthesis can then be carried out using $Y'$ as the desired matrix and by inserting a positive resistance in series with each of the $2n$ ports of the network characterized by $Y'$. These positive resistors have positive values as given in the diagonal matrix R.

It is to be understood that the above-described arrangements are merely illustrative of the numerous and varied other arrangements which might comprise applications of the principles of the invention. Such other arrangements may readily be devised by those skilled in the art without departing from the spirit and scope of this invention.

What is claimed is:

1. A signal transmission network having $n$ ports, where $n$ is greater than one, and comprising at least $n$ two-terminal negative impedances and a $2n$-port passive network including only resistors and capacitors, a first $n$ of said $2n$ ports comprising the ports of said signal transmission network, and means for connecting each individual one of said negative impedances across a corresponding one of the remaining $n$ of said $2n$ ports.

2. A signal transmission network according to claim 1 wherein said $2n$-port passive network includes a plurality of two-port networks each including only resistors and capacitors, means for connecting one of said two-port networks between each of said first $n$ ports and each of said remaining $n$ ports of said $2n$-port network, means for connecting one of said two-port networks between each of said first $n$ ports and each other of said first $n$ ports, and means for connecting one of said two-port networks between each of said remaining $n$ ports and each other of said remaining $n$ ports.

3. A signal transmission network having $n$ ports, where $n$ is greater than one, at least $n$ negative impedances, and circuit means including at least $(2n^2-n)$ two-port networks interconnecting said $n$ ports and said $n$ negative impedances, said two-port networks each including only resistors and capacitors.

4. A signal transmission network comprising $n$ external ports, where $n$ is greater than one, $n$ negative impedances, a two-port network including only resistors and capacitors connecting each of said $n$ ports to each of said negative impedances, a two port-network including only resistors and capacitors connecting each of said $n$ ports with each other of said $n$ ports, and a two-port network including only resistors and capacitors connecting each of said negative impedances with each other of said negative impedances.

5. An active signal transmission network comprising $n$ external ports, where $n$ is an integer greater than one, and having $n^2$ prescribed reciprocal parameters associated therewith, at least $n$ negative impedances, and a $2n$-port passive transducer including only resistors and capacitors interconnecting said $n$ external ports and said negative impedances, said $2n$-port passive transducer being constructed to realize said $n^2$ prescribed parameters at said $n$ external ports.

6. A signal transmission network according to claim 5 wherein each of said negative impedances comprises a negative resistance device connected in parallel with a positive impedance.

7. A signal transmission network according to claim 5 wherein each of said negative impedances comprises a negative impedance converter, a positive impedance, and means connecting said positive impedance across the output of said negative impedance converter.

8. A signal transmission network according to claim 5 further including a positive resistance element connected in series with each of said $2n$ ports.

9. In combination, a passive network having $2n$ pairs of terminals and including only resistors and capacitor, means connecting a negative resistive-capacitive impedance across a first $n$ of said $2n$ pairs of terminals, utilization means having $n$ pairs of terminals, and means for connecting said utilization means to the remaining $n$ of said $2n$ pairs of terminals.

10. The combination according to claim 9 wherein said passive network includes a plurality of four-terminal networks each including only resistors and capacitors, means for connecting one of said four-terminal networks between each of said first $n$ of said $2n$ pairs of terminals and each of said remaining $n$ of said $2n$ pairs of terminals.

11. The combination according to claim 10 including a further plurality of four-terminal networks each including only resistors and capacitors, means for connecting one of said four-terminal networks between each of said first $n$ pairs of terminals and each other of said first $n$ pairs of terminals, and means for connecting one of said four-terminal networks between each of said remaining $n$ pairs of terminals and each other of said remaining $n$ of said $2n$ pairs of terminals.

No references cited.